A. G. ELVIN, A. B. FAHNESTOCK & F. H. CLARK.
MECHANICAL STOKER.
APPLICATION FILED SEPT. 20, 1917.
1,267,644.
Patented May 28, 1918.
5 SHEETS—SHEET 1.
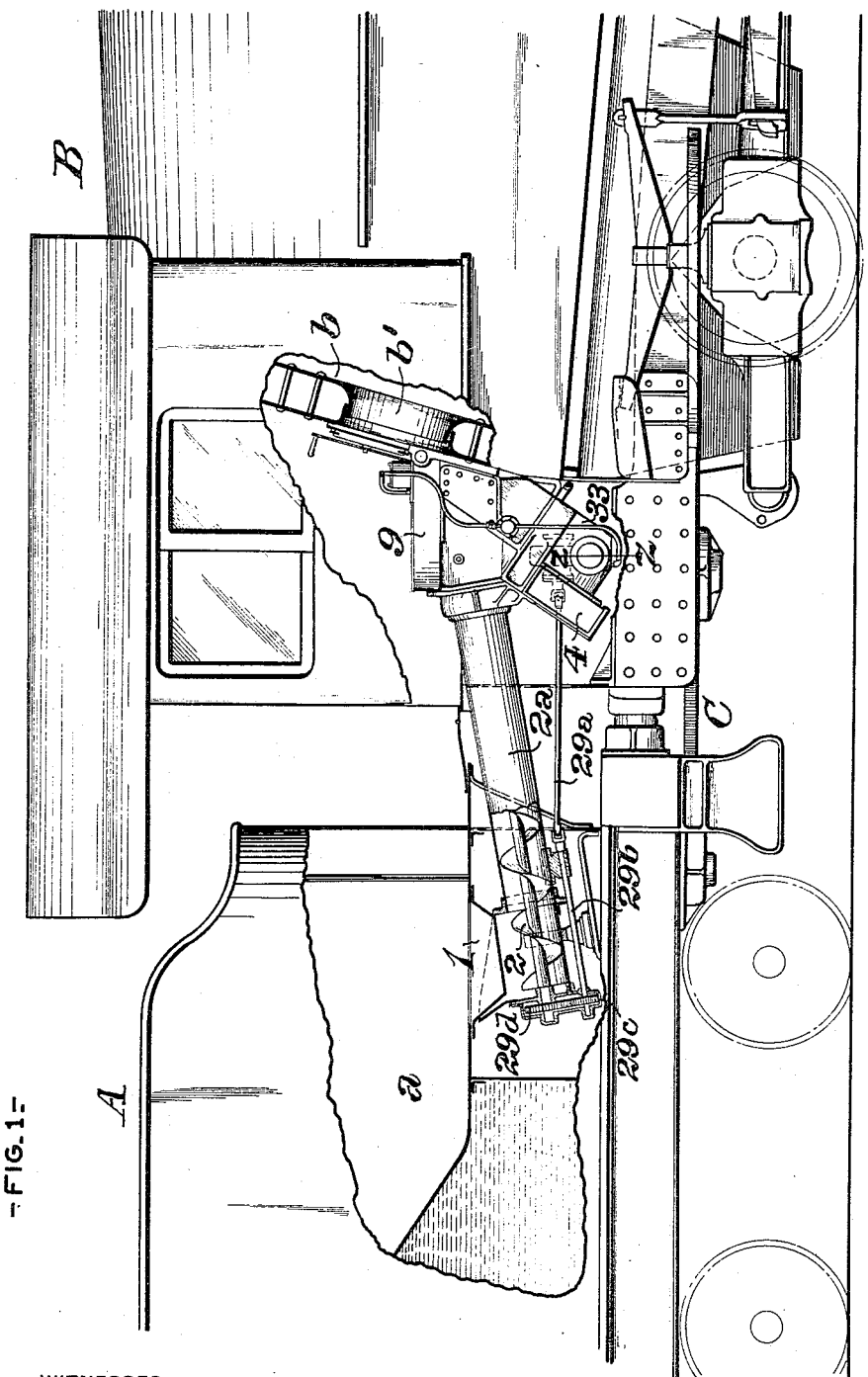

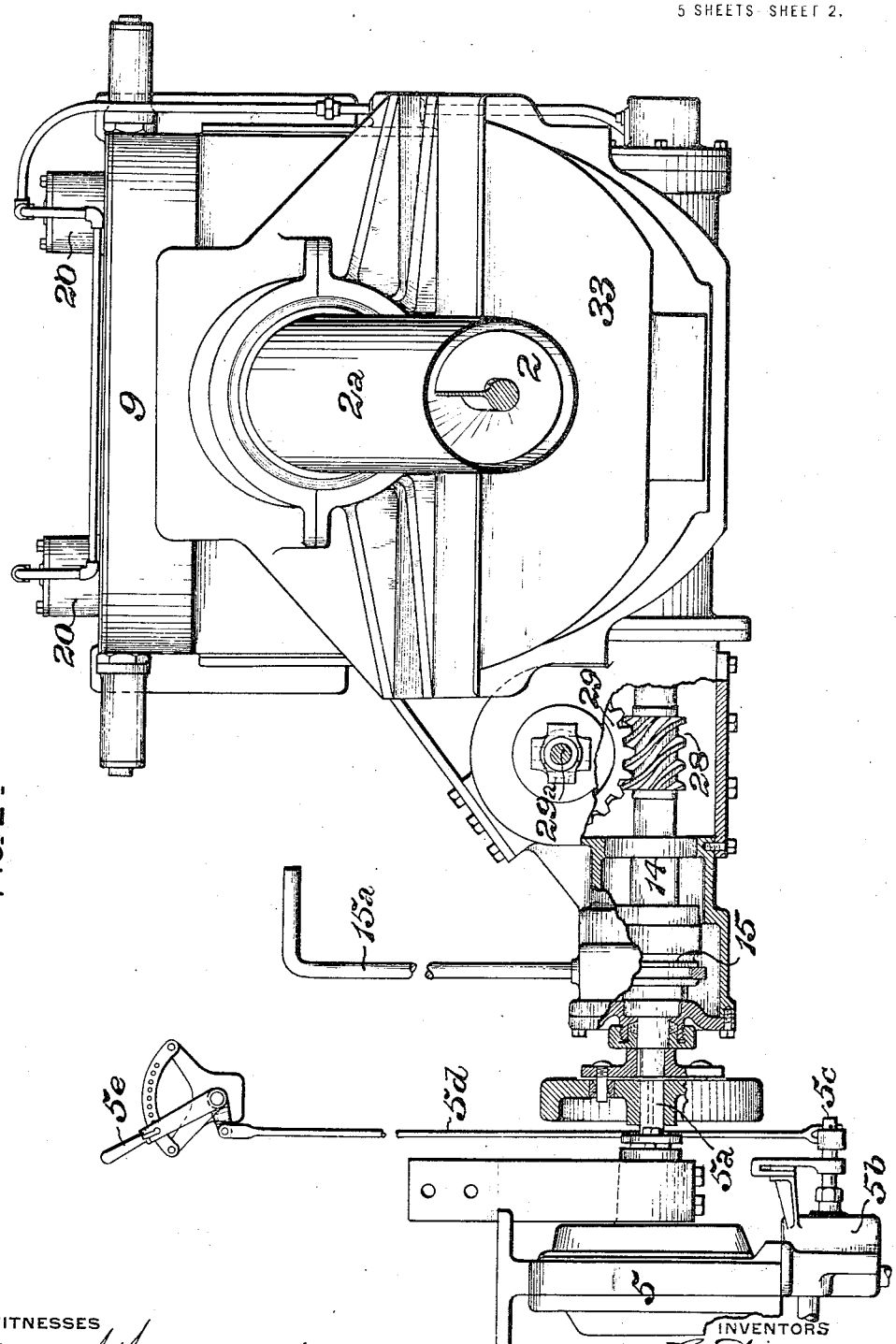

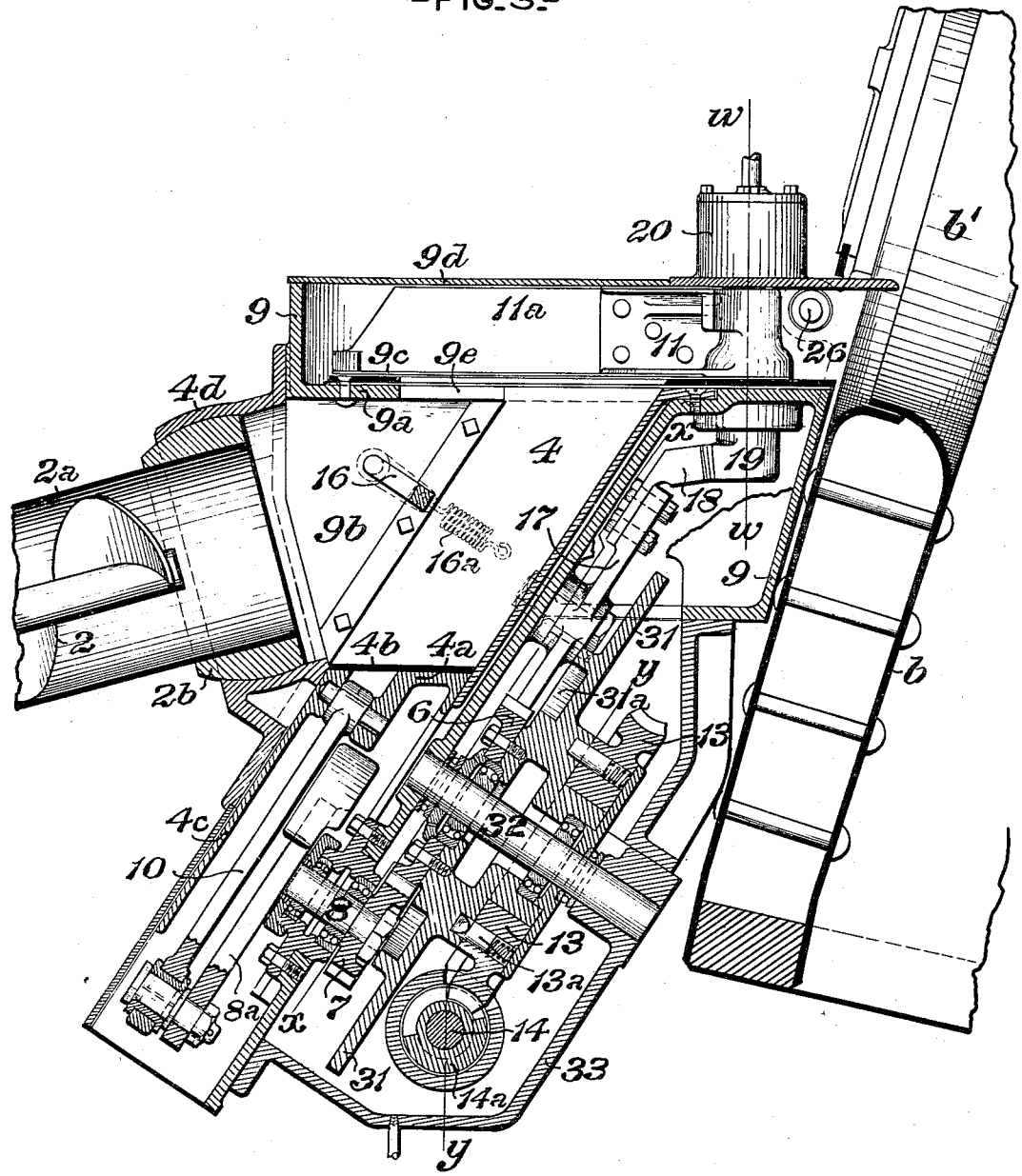

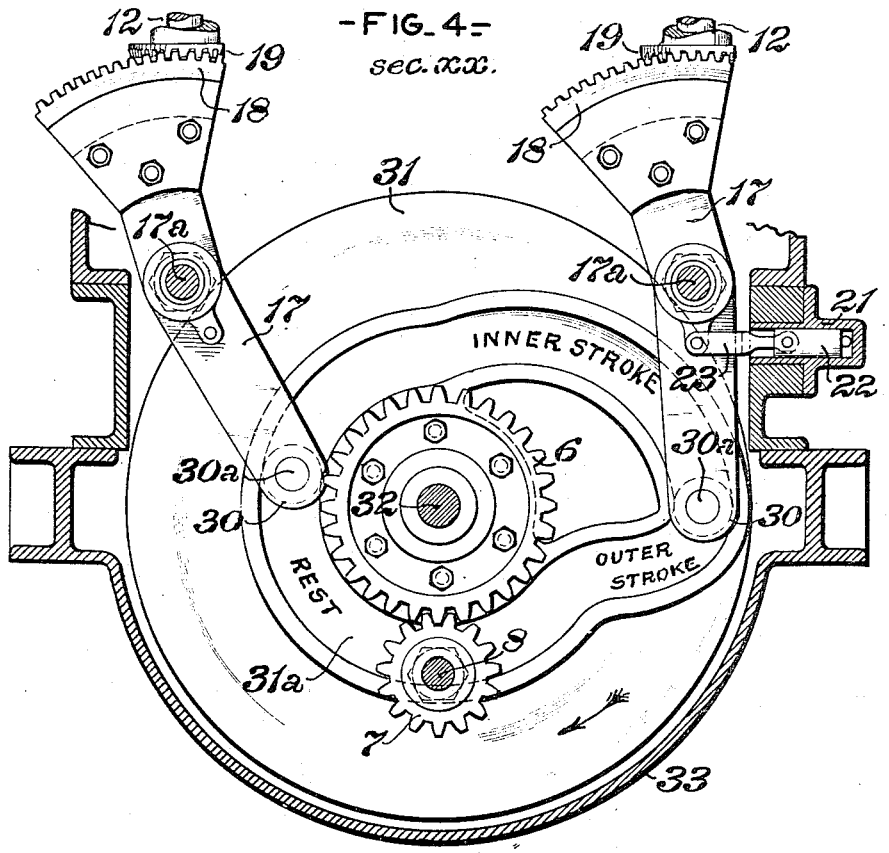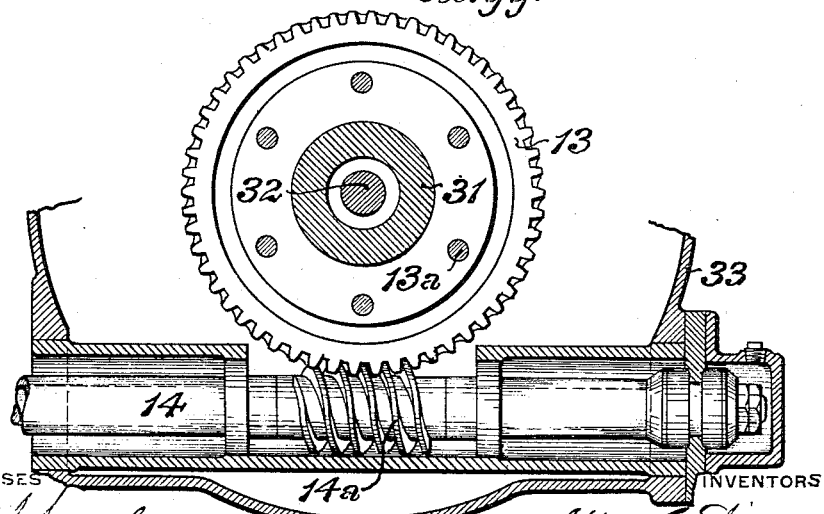

A. G. ELVIN, A. B. FAHNESTOCK & F. H. CLARK.
MECHANICAL STOKER.
APPLICATION FILED SEPT. 20, 1917.
1,267,644.
Patented May 28, 1918.
5 SHEETS—SHEET 5.
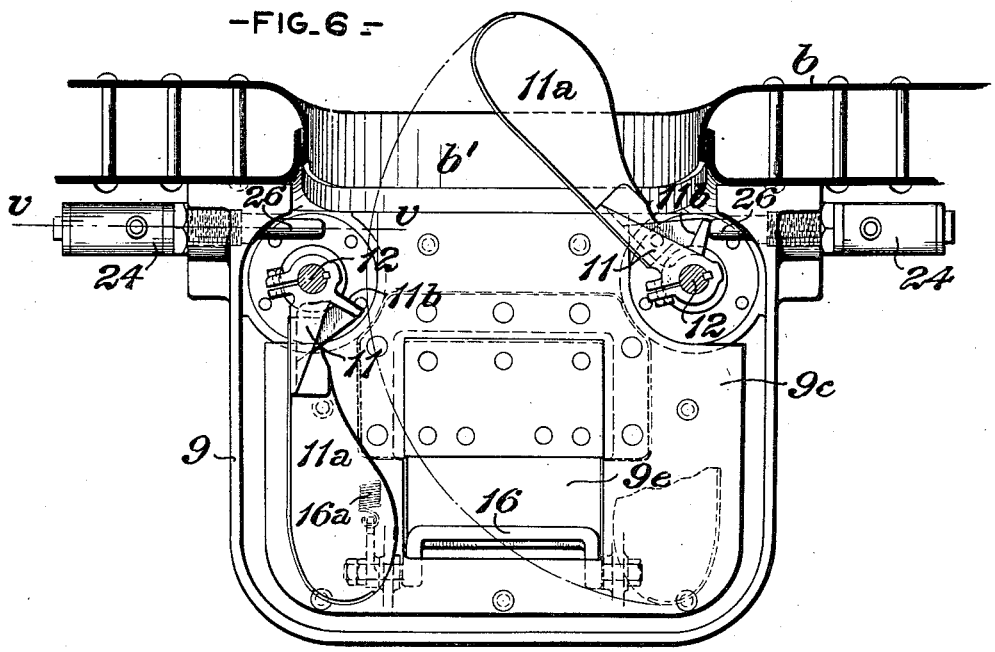
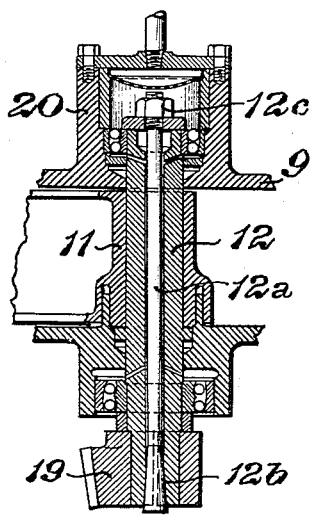
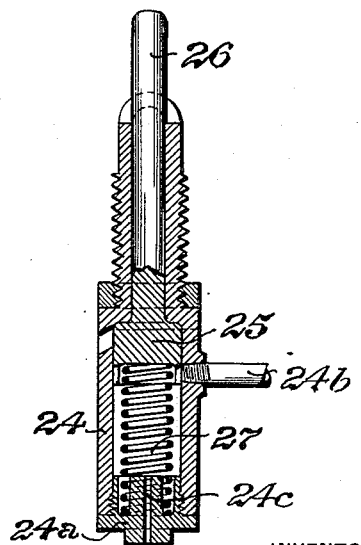

UNITED STATES PATENT OFFICE.

ALBERT G. ELVIN, OF PLANDOME, ADAM BRUCE FAHNESTOCK, OF GREAT NECK, AND FRANK H. CLARK, OF NEW YORK, N. Y.; SAID FAHNESTOCK AND SAID CLARK ASSIGNORS TO SAID ELVIN.

MECHANICAL STOKER.

1,267,644. Specification of Letters Patent. Patented May 28, 1918.

Application filed September 20, 1917. Serial No. 192,260.

*To all whom it may concern:*

Be it known that we, ALBERT G. ELVIN, of Plandome, in the county of Nassau and State of New York, ADAM B. FAHNESTOCK, of Great Neck, in said county and State, and FRANK H. CLARK, of New York, in the county of New York and State of New York, have jointly invented a certain new and useful Improvement in Mechanical Stokers, of which improvement the following is a specification.

Our invention relates to appliances for mechanically feeding fuel to locomotive and other steam boiler furnaces, of the class or type in which the members which act directly to project the fuel into the furnace are in the form of fuel carrying and throwing shovels, moving about axes adjacent to a firing opening in the furnace, as generally exemplified in Letters Patent of the United States Nos. 1,058,356; 1,111,531; and 1,128,428, granted and issued to Albert G. Elvin aforesaid, under dates of April 8, 1913, September 22, 1914, and February 16, 1915, respectively.

The object of our invention is to materially simplify the construction, and improve the operation, of mechanical stokers of the above specified type, by the provision of means whereby the movements of the shovels and the mechanism for supplying fuel thereto shall be positively synchronized in proper relation; the clogging of, and resultant damage to the mechanism by the accidental lodgment of fuel therein, be effectively guarded against; facilities for thorough lubrication of, and ready access to, the movable members, be provided; and the application of power be effected to all the movable members, from a single operating motor, under a simplified construction of the transmission elements.

The improvement claimed is hereinafter fully set forth.

In the accompanying drawings: Figure 1 is a view, partly in side elevation and partly in section, of the adjoining portions of a coupled locomotive engine and tender, illustrating an application of our invention; Fig. 2, a rear view, on an enlarged scale and partly in section on the line $z$ $z$ of Fig. 1, of the elevator casing and shovel box, showing also the operating mechanism; Fig. 3, a vertical longitudinal central section through the elevator and gear casings and the shovel box; Fig. 4, a transverse section through the gear casing, on the line $x$ $x$ of Fig. 3; Fig. 5, a similar section on the line $y$ $y$ of Fig. 3; Fig. 6, a plan or top view of the shovel box, with the cover removed; Fig. 7, a longitudinal central section through a shovel shaft, on the line $w$ $w$ of Fig. 3, and Fig. 8, a similar section through a shovel buffer, on the line $v$ $v$ of Fig. 6.

Referring descriptively to the specific embodiment of our invention which is herein exemplified, it is, as in Letters Patent Nos. 1,058,356 and 1,128,428 aforesaid, illustrated as applied in connection with a locomotive engine, (indicated as a whole by B), and a tender, (indicated as a whole by A) which are coupled together for service, in the ordinary manner, by a draw bar, C, such application of our invention being made, as in said Letters Patent, for the purpose of mechanically conveying fuel from the coal space, $a$, of the tender, to the firing door opening, $b'$, of the firebox, $b$, of the locomotive, and intermittently projecting apportioned quantities of the fuel, through said opening, into the firebox.

Our invention consists in certain improved features of structure and combined operative action, all of which will be hereinafter fully described, of the essential elements of the Letters Patent aforesaid, which, broadly stated are: ($a$), a fluid pressure motor, which actuates, in appropriate relation and sequence, the following operating instrumentalities, to wit; ($b$), a conveyer, by which fuel is transferred from the coal bin of the tender to the vicinity of the firebox of the locomotive; ($c$), an elevator, to which fuel is delivered by the conveyer, and by which it is raised to the proper level for firing; ($d$), a shovel box or receptacle, to which fuel is delivered by the elevator; ($e$), a swinging shovel, by which fuel is carried from a location of deposit in the shovel box and projected into the firebox; and ($f$), intermediate actuating mechanism.

In the practice of our invention, we provide, at the front end of the coal space, ($a$), of the tender, a supply hopper, 1, through which fuel is supplied, by gravity, to a conveyer, which may be of any suitable and preferred construction, and, in this instance, is shown as being a screw, 2, which is journaled in an upwardly and forwardly inclined casing, 2ª, the rear end of which is supported on the tender, and the forward end of which is articulated to the lower section of a shovel box, 9, secured to the firebox, B, of the locomotive, by a ball member, 2ᵇ, fitting in a socket, 4ᵈ, bolted to the shovel box. Rotation is imparted to the conveyer screw, 2, by an operating motor, 5, through connections hereinafter described and it is unaffected by relative movement of the locomotive and tender, by reason of being free to accommodate itself thereto, through the ball joint connection at the forward end of the conveyer casing.

The shovel box, 9, is divided by a partition, 9ª, located at or near the lower level of the firing door opening, b, into an upper section, in which two vibratory fuel carrying and throwing shovels are fitted to be oscillated about substantially vertical axes, and a lower section, the rear portion of which forms a fuel receiving pocket, 9ᵇ, into which the forward or delivery end of the conveyer casing, 2ª, opens. An upwardly and forwardly inclined elevator casing, 4, is secured to the shovel box, said casing extending through the lower section thereof, and below said lower section, and being open, at its top, to the upper section of the shovel box, and, on its rear side, to the fuel receiving pocket, 9ᵇ, the front of which consequently presents a correspondingly forwardly and upwardly inclined opening. A floor plate, 9ᶜ, is secured on the top of the partition, 9ª, and the upper section of the shovel box is closed, at top, by a cover plate, 9ᵈ. The partition, 9ª, and floor plate, 9ᶜ, are recessed or cut away, so as to form an opening, 9ᵉ, between the upper section of the shovel box and the fuel receiving pocket, 9ᵇ, at the top and front of said pocket. This opening permits any fragments of fuel that may overhang the back of the elevator plunger to pass into the upper section of the shovel box, on the upward stroke of the plunger, and prevents them from being jammed between it and the partition, 9ª. The portion of the firing door opening, b¹, above the top of the shovel box, is closed by a door or doors of any suitable and preferred form, by manipulation of which the locomotive can be manually fired, if it should, at any time, become necessary or desirable to intermit the operation of the mechanism of our invention.

A gear case, 33, is bolted to the bottom of the shovel box, 9, and a cam shaft, 32, is secured therein, forward of, and at a right angle to, the elevator casing, 4. A spur gear, 6, fixed on a shovel operating disk cam, 31, which is journaled on the cam shaft, 32, engages a corresponding pinion, 7, on a shaft, 8, journaled in the gear case. An elevator plunger, 4ª, having a face plate, 4ᵇ, fixed to its top, is fitted to reciprocate in the elevator casing, 4, said plunger being coupled, by a connecting rod, 10, to a crank, 8ª, fixed on the shaft, 8. The stroke of the elevator plunger is such that it traverses between a receiving position at the level of the bottom of the fuel pocket, as indicated in Fig. 3, to a delivery position substantially at the level of the bottoms of the shovels. A worm wheel, 13, which is journaled on the hub of the cam, 31, rotates said cam in one direction, when engaged with ratchets thereon by a plurality of spring pawls, 13ª, and, when rotated, in the opposite direction, does not impart movement to the cam or the members connected therewith. The worm wheel, 13, engages a worm, 14ᶜ, fixed on a driving shaft, 14, journaled in the casing, 33, and connected, by a clutch coupling, 15, which is manually operated by a clutch lever, 15ª, with the shaft, 5ª, of the motor, 5. The motor is controlled by a throttle valve, fitted in a chest, 5ᵇ, the stem, 5ᶜ, of the throttle valve, being coupled, by a link, 5ᵈ, to a throttle lever, 5ᵉ, located within convenient reach of the fireman.

A closure plate, 4ᶜ, is connected to the rear side of the elevator plunger, 4ª, and reciprocates therewith in the casing, 4, the function of said plate being to close communication between the fuel receiving pocket, 9ᵇ, and the elevator casing, when the plunger reaches the top of the fuel receiving pocket. A wiper, 16, which is of substantially U form, extends across the forward open end of the fuel receiving pocket, 9ᵇ, and is normally held in the position shown in Fig. 3, by a spring, 16ª. The wiper serves to prevent the movement of the elevator plunger from being obstructed by comparatively large overhanging fragments of fuel, by either pushing them forward so as to rest completely on the face plate, 4ᵇ, or knocking them back into the fuel receiving pocket, to be brought up in proper position on a succeeding upward movement of the plunger.

A cam groove, 31ª, is formed on the rear face of the disk cam, 31, a portion of said groove, extending for about 200 degrees around the axis of the cam shaft, 32, being concentric with said shaft; an adjoining and comparatively shorter portion being outwardly curved; and the remaining portion, which is longer than the outward curved portion, being inwardly curved to its junction with the concentric portion, all as clearly shown in Fig. 4. It follows, from the form of the cam groove, that in the rotation of the cam, a member engaging with the groove will remain at rest while the concentric portion of the groove is passing it; will be moved in one direction, comparatively rapidly, while the shorter inclined portion is passing it; and will be moved in the opposite direction, comparatively slowly, while the longer inclined portion is passing it; the periods of rest, of relatively quick movement in one direction, and of relatively slow movement in the opposite direction, being successive, in the order stated.

Two rockers 17, 17, are journaled on pins, 17$^a$, fixed in the lower portion of the shovel box, on opposite sides of a plane passing through the axes of the cam shaft, 32, and the pinion shaft, 8, and a roller, 30, fitting in the cam groove, 31$^a$, is journaled on a pin, 30$^a$, at one end of each of the rockers. The opposite ends of the rockers carry segments, 18, which engage corresponding pinions, 19, fixed on the lower ends of two shovel shafts, 12, journaled in the shovel box, adjacent to, and on opposite sides of, the firing door opening, $b'$, each of said shafts having a fuel carrying and throwing shovel, comprising a stock or body, 11, and a blade, 11$^a$, fixed upon it, adjacent to its upper end. In order to enable the pinions, 19, to be tightened on the shovel shafts, if desired, the lower ends of the shafts are longitudinally divided, as indicated in dotted lines in Fig. 7, and a stem, 12$^a$, having a tapered or conical expander, 12$^b$, on its lower end, is passed centrally through each shovel shaft. The upper ends of the stems, 12$^a$, are threaded, and provided with nuts, 12$^c$, abutting on washers on the tops of the shovel shafts, by tightening which nuts, the expanders, 12$^b$, are drawn upwardly to expand the lower ends of the shovel shafts into the pinions, 19. Oil reservoirs, 20, are formed on, or secured to, the shovel box, around and above the shovel shafts, to enable said shafts to be continuously and thoroughly lubricated.

It will be observed that nearly all the moving members of the appliance that require lubrication, are inclosed within the shovel box, 9, and gear case, 33, and for the purpose of automatic and continuous lubrication thereto, an oil pump is provided, which may be in the form of a cylinder, 21, secured to the gear case, 33, and fitted with a piston or plunger, 22, which is coupled, by a link, 23, to one of the rockers, 17, by the movements of which it is reciprocated in the cylinder. The oil pump is provided with suitable suction and discharge valves, of ordinary construction, and is properly piped to the lower portion of the gear case, and to an oil supply tank, or to any other portion of the appliance that may be selected.

In order to cushion the shovels at the outer extremities of their vibratory traverses, a buffer cylinder, 24, is secured to each side of the shovel box, between the adjacent shovel shaft and the end of the shovel box which adjoins the firebox, $b$, and is fitted with a piston, 25, having a stem, 26, which projects into the shovel box, in position to be struck by an arm, 11$^b$, on the adjacent shovel stock, 11, as the shovel approaches the outer end of its stroke. In the instance shown, resistance to the inward movement of the piston is provided by the admission of fluid under pressure to its inner side, through a pipe, 24$^b$, and it is moved outwardly by a helical spring, 27, which is interposed between, and bears on, the piston, and a removable cap, 24$^a$, which closes the outer end of the cylinder, fluid pressure being released through a small leak passage, 24$^c$, in the cap. As a mechanical equivalent, the spring may be made of sufficient tension to afford resistance without fluid pressure admission.

The conveyer screw, 2, is rotated by the motor, 5, through the driving shaft, 14, which carries a worm, 28, engaging a worm wheel, 29, on a shaft, 29$^a$, which is coupled, by a universal joint, to a shaft, 29$^b$, carrying a spur pinion, 29$^c$, which engages a corresponding gear, 29$^d$, on the shaft of the screw conveyer, 2.

In the operation of a mechanical stoker embodying our invention, the fuel which is transferred from the coal bin of the tender to the locomotive, is delivered, from the forward end of the conveyer casing, into the fuel receiving pocket, 9$^d$, and drops from the forward end thereof, into the elevator casing, 4, from which it is raised, in successive portions or charges, by the elevator plunger, 4$^a$, into the upper section of the shovel box, 9, and between the shovels therein. Each charge of fuel is projected into the firebox by the outward movement of the shovel which stands behind it, which shovel returns to its rear position before another charge of fuel is supplied to it; the elevator plunger moves downwardly to receive another charge of fuel, and the shovel which was in its forward position when the preceding charge was thrown into the firebox, moves to its backward position; the elevator plunger delivers another charge of fuel to the upper section of the shovel box, and said charge is similarly thrown into the firebox by the shovel last specified. Each shovel, after picking up a charge of fuel from the elevator plunger, moves rapidly forward until its forward edge reaches the front of the firing door opening, when the projection of fuel from it into the firebox commences, and continues throughout the remainder of its stroke, at the terminal of which it is quickly stopped and the fuel which then remains upon it is thrown toward a corner of the firebox. The movements of the several members, in proper operative sequence and relation, are insured by the form of the cam groove, the proportions of the driving gears of the elevator plunger and adjustment of its driving crank, and the operation of the cam, the elevator plunger, and the shovels, from a common driving shaft.

Among the practical advantages of our invention that will be recognized by those familiar with locomotive engine construction and operation, there may be enumerated the compactness and simplicity of the apparatus, and the ability of locating nearly all those portions of it which are on the locomotive, entirely below the firing deck; the inclosure and protection of all working parts, with the capacity of ready access when desired, and effective lubrication; and the coördination and synchronization of movements of the fuel feeding and fuel projecting appliances, by reason of their positive connections to the driving shaft of the motor.

We claim as our invention and desire to secure Letters Patent:

1. In a mechanical stoker, the combination of a receptacle, adapted to be supported on a locomotive, and to communicate with a firing opening in the firebox thereof; a fuel projecting member, mounted in said receptacle; an elevator casing, communicating at its top with said receptacle; an elevator plunger fitted to reciprocate in said casing; a motor; and positive connections actuated by said motor, for effecting the coördinated alternate operation of the fuel projecting member and the elevator plunger.

2. In a mechanical stoker, the combination of a shovel box, adapted to be supported on a locomotive, and to communicate with a firing opening in the firebox thereof; two fuel projecting shovels, mounted to swing in said shovel box; an elevator casing, communicating, at its top, with said shovel box; an elevator plunger fitted to reciprocate in said casing; a motor; and positive connections, actuated by said motor, for effecting the coördinated alternate swinging movements of the fuel shovels, and the reciprocating movements of the elevator plunger.

3. In a mechanical stoker, the combination of a shovel box, adapted to be supported on a locomotive, and to communicate with a firing opening in the firebox thereof; two fuel projecting shovels, mounted to swing in said shovel box; an elevator casing, communicating, at its top, with said shovel box; an elevator plunger fitted to reciprocate in said casing; a fuel receiving pocket, opening into said casing; a motor; and positive connections, actuated by said motor, for effecting the coördinated alternate swinging movements of the fuel shovels, and the reciprocating movements of the elevator plunger.

4. In a mechanical stoker, the combination of a shovel box, adapted to be supported on a locomotive, and to communicate with a firing opening in the firebox thereof; a fuel shovel, mounted to swing in said shovel box; an elevator casing, communicating, at its top, with said shovel box; an elevator plunger fitted to reciprocate in said casing, a fuel receiving pocket, opening into said casing; means for supplying fuel to said pocket; a motor; and positive connections for effecting the coördinated operation of the fuel supply means, the elevator plunger, and the shovel, by said motor.

5. In a mechanical stoker, the combination of a shovel box, adapted to be supported on a locomotive, and to communicate with a firing opening in the firebox thereof; a fuel shovel, mounted to swing in said shovel box; an elevator casing, communicating, at its top, with said shovel box; an elevator plunger fitted to reciprocate in said casing, a fuel receiving pocket, opening into said casing; a closure plate connected to the elevator plunger and adapted to alternately close and open communication between the fuel receiving pocket and the elevator casing; means for supplying fuel to the fuel receiving pocket; a motor; and positive connections for actuating the fuel supply means, the elevator plunger, and the shovel, by said motor.

6. In a mechanical stoker, the combination of a shovel box, adapted to be supported on a locomotive, and to communicate with a firing opening in the firebox thereof; a fuel shovel, mounted to swing in said shovel box; an elevator casing, inclined upwardly and toward the delivery end of the shovel box; and communicating, at its top, with said shovel box; an elevator plunger, fitted to reciprocate in said casing; a fuel receiving pocket, opening into said casing; means for supplying fuel to said pocket; a motor; and positive connections for actuating the fuel supply means, the elevator plunger, and the shovel, by said motor.

7. In a mechanical stoker, the combination of a shovel box, adapted to be supported on a locomotive, and to communicate with a firing opening in the firebox thereof; a fuel shovel, mounted to swing in said shovel box; an elevator casing, communicating, at its top, with said shovel box; an elevator plunger fitted to reciprocate in said casing; a fuel receiving pocket, opening into said casing; an automatically operable wiper, mounted at the delivery end of said pocket, and acting to prevent undue protrusion of fragments of fuel beyond the adjoining side of the elevator plunger; means for supplying fuel to the pocket; a motor; and positive connections for actuating the fuel supply means, the elevator plunger, and the shovel, by said motor.

8. In a mechanical stoker, the combination of a shovel box, adapted to be supported on a locomotive, and to communicate with a firing opening in the firebox thereof; a partition dividing said shovel box into upper and lower sections; a fuel shovel, mounted to swing in the upper section of said shovel box; an elevator casing, communicating, at its top, with the upper section of said shovel box; an elevator plunger fitted to reciprocate in said casing; a fuel receiving pocket, opening, through the lower sections of the shovel box, into said casing; means for supplying fuel to said pocket; a motor; and positive connections for actuating the fuel supply means, the elevator plunger, and the shovel, by said motor.

9. In a mechanical stoker, the combination of a shovel box, adapted to be supported on a locomotive, and to communicate with a firing opening in the firebox thereof; a partition dividing said shovel box into upper and lower sections; a fuel shovel, mounted to swing in the upper section of said shovel box; an elevator casing, communicating at its top, with the upper section of said shovel box, through an opening in the partition, having a relieving recess on its side farther from the delivery end of the shovel box; an elevator plunger fitted to reciprocate in said casing; a fuel receiving pocket, opening, through the lower section of the shovel box, into said casing; means for supplying fuel to said pocket; a motor; and positive connections for actuating the fuel supply means, the elevator plunger, and the shovel, by said motor.

10. In a mechanical stoker, the combination of a shovel box, adapted to be supported on a locomotive, and to communicate with a firing opening in the firebox thereof; a fuel shovel, mounted to swing in said shovel box; a subjacent gear case connected to the shovel box; an elevator casing, communicating, at its top, with the shovel box; an elevator plunger fitted to reciprocate in said casing; a motor; a driving shaft journaled in the gear case and connected to said motor; and gearing, mounted in the gear case and imparting movement from said driving shaft to the fuel shovel and the elevator plunger.

11. In a mechanical stoker, the combination of a shovel box, adapted to be supported on a locomotive, and to communicate with a firing opening in the firebox thereof; a fuel shovel, mounted to swing in said shovel box; a subjacent gear case connected to the shovel box, and forming therewith an inclosed casing; an elevator casing, communicating, at its top, with the shovel box; an elevator plunger fitted to reciprocate in said casing; a motor; a driving shaft, journaled in the gear case and connected to said motor; gearing, inclosed in the gear case and imparting movement from said driving shaft to the fuel shovel and the elevator plunger, and means for effecting a circulation of lubricant through the shovel box and gear case.

12. In a mechanical stoker, the combination of a shovel box, adapted to be supported on a locomotive, and to communicate with a firing opening in the firebox thereof; a fuel shovel, mounted to swing in said shovel box; a subjacent gear case connected to the shovel box and forming therewith an inclosed casing; an elevator casing, communicating, at its top, with the shovel box; an elevator plunger fitted to reciprocate in said casing; a motor; a driving shaft journaled in the gear case and connected to the motor; gearing, inclosed in the gear case and imparting movement from said driving shaft to the fuel shovel and the elevator plunger; and an oil pump, actuated through connections from the driving shaft, for effecting a circulation of lubricant through the shovel box and gear case.

13. In a mechanical stoker, the combination of a shovel box, adapted to be supported on a locomotive, and to communicate with a firing opening in the firebox thereof; a fuel shovel, mounted to swing in said shovel box, a subjacent gear case connected to the shovel box; an elevator casing, communicating, at its top, with the shovel box; an elevator plunger fitted to reciprocate in said casing; a conveyer for supplying fuel to said casing; a motor; a driving shaft journaled in the gear case and connected to said motor; and gearing, mounted in the gear case and imparting movement from said driving shaft to the conveyer, the elevator plunger, and the fuel shovel.

14. In a mechanical stoker, the combination of a shovel box, adapted to be supported on a locomotive, and to communicate with a firing opening in the firebox thereof; a shovel shaft, mounted to swing in said shovel box; a fuel shovel fixed on said shaft; a rotatable grooved operating cam; a rocker journaled adjacent to said cam, and rotatable by engagement with the groove thereof; and gearing, through which swinging movements are imparted to the shovel shaft by the rocker.

15. In a mechanical stoker, the combination of a shovel box, adapted to be supported on a locomotive, and to communicate with a firing opening in the firebox thereof; a shovel shaft, mounted to swing in said shovel box; a fuel shovel fixed on said shaft; a rotatable grooved operating cam; a rocker journaled adjacent to said cam; a roller, journaled at one end of the rocker and engaging the groove of the cam; and a segment gear fixed to the opposite end of the rocker and engaging a corresponding pinion on the shovel shaft.

16. In a mechanical stoker, the combination of a shovel box, adapted to be supported on a locomotive, and to communicate with a firing opening in the firebox thereof; a shovel shaft, mounted to swing in said shovel box; a fuel shovel fixed on said shaft; an elevator casing, communicating with said shovel box; an elevator plunger, fitted to reciprocate in said casing; a rotatable grooved operating cam; gearing through which said plunger is reciprocated by said cam; a rocker journaled adjacent to said cam, and rotatable by engagement with the groove thereof; and gearing, through which swinging movements are imparted to the shovel shaft by the rocker.

17. In a mechanical stoker, the combination of a shovel box, adapted to be supported on a locomotive, and to communicate with a firing opening in the firebox thereof; a shovel shaft, journaled in said shovel box; a fuel shovel fixed on said shaft; means for positively swinging said shaft in alternately opposite directions; and means for cushioning said shovel at the outer extremity of its stroke.

18. In a mechanical stoker, the combination of a shovel box, adapted to be supported on a locomotive, and to communicate with a firing opening in the firebox thereof; a shovel shaft, journaled in said shovel box; a fuel shovel fixed on said shaft; means for positively swinging said shaft in alternately opposite directions; and a resistance buffer attached to the shovel box, in position to be contacted with by the shovel as it approaches the outer extremity of its stroke.

19. In a mechanical stoker, an inclosing casing for gearing and other movable members, comprising a shovel box, divided by a partition into upper and lower sections, and having a fuel receiving pocket at one side of its lower section; an elevator casing extending through and below the lower section, at an angle to the upper section, and open thereto at its top, and also open to the fuel receiving pocket; and a gear case, secured to, and depending from, the shovel box, on the side of the elevator casing farther from the fuel receiving pocket, said gear case forming a lubricant receptacle for the inclosed movable members.

20. In a mechanical stoker, an inclosing casing for gearing and other movable members, comprising a shovel box, divided by a partition into upper and lower sections; an elevator casing extending through and below the lower section, at an angle to the upper section, and open thereto at its top; a fuel receiving pocket in the lower section, communicating, by an inclined opening, with the elevator casing; and a gear case, secured to, and depending from, the shovel box, on the side of the elevator casing farther from the fuel receiving pocket, said gear case forming a lubricant receptacle for the inclosed movable members.

ALBERT G. ELVIN.
ADAM BRUCE FAHNESTOCK.
FRANK H. CLARK.

Witnesses:
A. C. BODEEM,
J. M. COFFEY.